Feb. 22, 1927.  1,618,428
L. S. HARWOOD ET AL
SOCKET
Filed Dec. 19, 1923
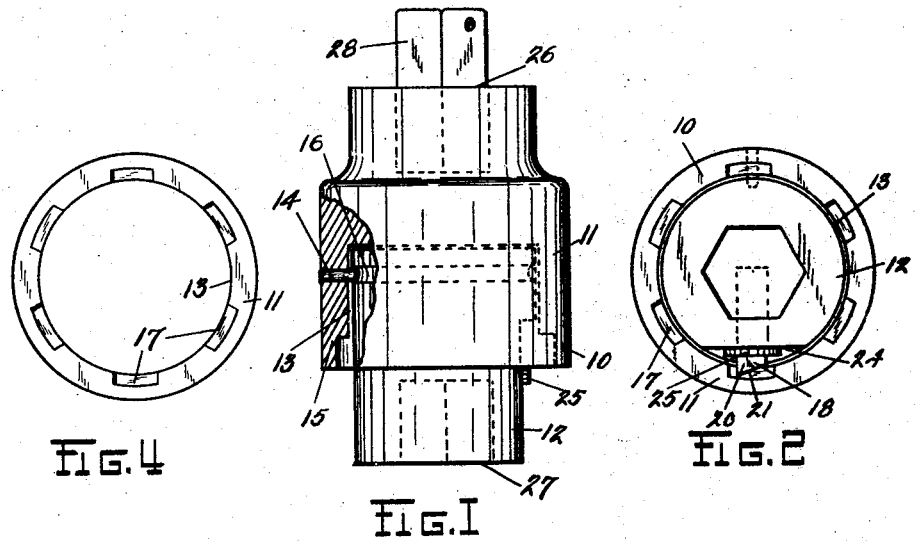
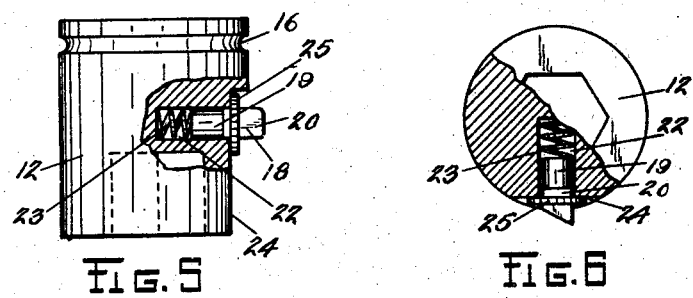
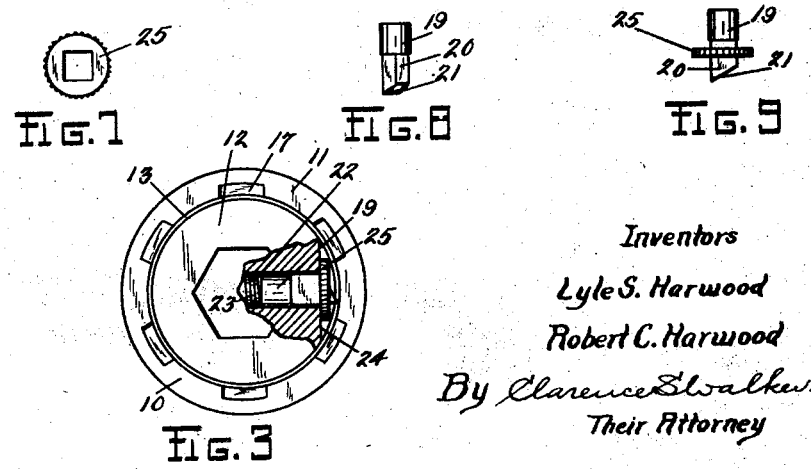
Inventors
Lyle S. Harwood
Robert C. Harwood
By Clarence S. Walker
Their Attorney Patented Feb. 22, 1927.

1,618,428

UNITED STATES PATENT OFFICE.

LYLE S. HARWOOD AND ROBERT C. HARWOOD, OF CELORON, NEW YORK.

SOCKET.

Application filed December 19, 1923. Serial No. 681,650.

This invention relates to an improvement in sockets, and more particularly to a socket adapted to be used as a part of a high speed or other socket wrench, or as a coupler member in connection with an extension.

The primary object of this invention is to provide a socket of such design that it will function with any type of socket wrench, and can be used as one of the elements of any of the socket wrench outfits on the market.

A further object of this invention is to provide a ratchet having a dog, which is easily reversed without removing the socket from its position of work, so that the socket can ratchet in either direction.

Other objects will appear from a consideration of the following specification taken in connection with the drawings which form a part thereof, and in which—

Fig. 1 is a front elevation of the socket partly in section showing the manner by which the two parts are held together;

Fig. 2 is a bottom view of Fig. 1 showing the dog in operative position;

Fig. 3 is a view similar to Fig. 2, partly in section, showing the dog in inoperative position;

Fig. 4 is a bottom view of the shell;

Fig. 5 is a front elevation of the stub partly in section showing the dog and means of reversing it;

Fig. 6 is a bottom view of the stub, partly in section showing the dog;

Fig. 7 is a view of the collar by which the dog is reversed;

Fig. 8 is a view of the dog; and

Fig. 9 is a view showing the collar and dog in position.

Referring to the drawings, the reference numeral 10 is employed to designate a socket embodying one form of this invention. This socket comprises a shell 11 and a stub 12 mounted to rotate in a chamber 13 of the shell.

The parts are joined by means of a pin 14 mounted in the wall 15 of the shell and entering an annular groove 16 in the upper end of the stub. As it will appear from an examination of Fig. 1, the pin 14 and groove 16 are so arranged, that their engagement does not in any way interfere with the free rotation of the stub in the shell while at the same time the stub cannot be removed.

At the mouth of the chamber are formed in the wall 15 a series of pockets or notches 17, which cooperate with a dog 18 in the stub 12 to transmit, in the usual way, the rotation of either shell or stub to the other member. The dog 18 has a cylindrical inner end 19 and a squared outer end 20, the face 21 of the outer end 20 being inclined. The dog is mounted in a radial pocket 22 being such, with reference to the groove 16, that when the stub and shell are assembled, as in Fig. 1, the dog is adapted to engage the recesses 17 on the shell, thus providing a ratchet mechanism of the usual type. Behind the dog 18 in the pocket 22 is mounted a spring 23 which forces the dog into engagement with the wall 15 of the shell at all times. When the stub 12 is turned in the anti-clockwise direction, referring to Figs. 2 and 3, the inclined face 21 will cause the dog to leave the pocket 17 and the spring 23 will hold it in contact with the wall 15 (see Fig. 3) until the adjoining pocket 17 is reached, at which time the dog will again be forced into the pocket. When, however, the stub is turned in the clockwise direction, the dog will bear against the wall of the pocket into which it projects and cause the shell 11 to rotate in the same direction. If, however, the power is applied to the shell 11 instead of to the stub 12, it is obvious that when the shell is rotated clockwise, no movement will be given to the stub 12, while when the shell is driven anti-clockwise, the stub will rotate with it.

A portion 24 of the wall of the stub adjacent the projecting end of the dog is flattened at right angles to the pocket 22 and loosely mounted upon the squared end 18 of the dog is a collar 25, preferably knurled. A part of the collar 25 projects beyond the mouth of the chamber 13 so that it can easily be engaged by the thumb or finger of the operator and turned 180° to reverse the direction of engagement of the dog 18 with the shell.

In the outer end of the shell 11, and the outer end of the stub 12 are formed hexagonal recesses or pockets 26, 27. These are preferably of the dimension of the socket known in the trade as No. 1, but obviously other dimensions may be given to them, if desired. In connection with the socket 10, there is also provided an extension bar 28, which may be inserted in either the pocket 26 or the pocket 27 and engaged by a wrench handle or other rotating means.

In using one of the well known socket outfits, it is often necessary in order to reach the nut to be operated upon to build up the tool by means of extension bars and couplers which form part of the outfits. In place of one of the couplers, the socket 10 may be employed, one of the extension bars entering the pocket 26 and another bar entering the pocket 27. Any tool thus becomes a ratchet which can be operated in either direction by turning the collar 25.

While one embodiment of this invention has been shown and described, we are not to be limited thereto since it is obvious that others may be made without departing from the spirit and scope of the invention as set forth in the following claims.

Having thus set forth our invention what we claim as new and for which we desire protection by Letters Patent is:

1. A socket including a shell having an open mouthed chamber therein, a stub mounted in said chamber and having a radial pocket, means permitting rotation of said stub in said chamber in one direction only, said means including ratchet mechanism comprising a series of notches in the wall of said chamber, a dog in the radial pocket of said stub adapted to engage said notches, a spring in said pocket holding said dog in engagement with said notches, the pressure exerted thereby tending to cause the side of said stub opposite to that through which said dog projects to bear against the wall of said chamber, and means for reversing said dog whereby said socket can be operated in either direction.

2. A socket including a shell having an open mouthed chamber therein, a stub mounted in said chamber and having a radial pocket, means permitting rotation of said stub in said chamber in one direction only, including ratchet mechanism comprising a series of notches in the wall of said chamber, a dog in the radial pocket of said stub adapted to engage said notches, a spring in said pocket holding said dog in engagement with said notches, the pressure exerted thereby tending to cause the side of said stub opposite to that through which said dog projects to bear against the wall of said chamber and a collar on the outer end of said dog, and projecting from the mouth of said chamber to permit rotation of the dog by the operator without withdrawing the stub from the chamber, whereby the socket can be set to operate in either direction.

In testimony whereof we have affixed our signatures.

LYLE S. HARWOOD.
ROBERT C. HARWOOD.